US007423093B2

(12) United States Patent
Lüer et al.

(10) Patent No.: US 7,423,093 B2
(45) Date of Patent: Sep. 9, 2008

(54) BASE PAINTS CONTAINING FATTY ACID-MODIFIED EPOXY ESTERS, METHODS FOR THE PRODUCTION THEREOF AND THEIR USE

(75) Inventors: Ingo Lüer, Maegretshöchheim (DE); Jorn Lavalaye, Würzburg (DE)

(73) Assignee: BASF Coatings AG, Munster (DE)

( * ) Notice: Subject to any disclaimer, the term of this patent is extended or adjusted under 35 U.S.C. 154(b) by 520 days.

(21) Appl. No.: 10/518,124

(22) PCT Filed: Jun. 28, 2003

(86) PCT No.: PCT/EP03/06883

§ 371 (c)(1),
(2), (4) Date: Dec. 15, 2004

(87) PCT Pub. No.: WO2004/018577

PCT Pub. Date: Mar. 4, 2004

(65) Prior Publication Data

US 2006/0063862 A1    Mar. 23, 2006

(30) Foreign Application Priority Data

Jul. 31, 2002   (DE)   ................. 102 34 794

(51) Int. Cl.
*C08L 63/00*  (2006.01)
*C08G 59/16*  (2006.01)

(52) U.S. Cl. .................. 525/438; 523/401; 523/436; 525/443; 525/453; 525/455; 525/457

(58) Field of Classification Search .................. 525/438
See application file for complete search history.

(56) References Cited

U.S. PATENT DOCUMENTS

| 2,956,902 | A | * | 10/1960 | Mortimer ..................... 428/416 |
| 3,294,721 | A | * | 12/1966 | Belanger .................. 525/111.5 |
| 3,479,306 | A | * | 11/1969 | Safranski, Jr. ............... 106/252 |
| 3,658,738 | A | * | 4/1972 | Van Westerenam ......... 527/601 |
| RE30,612 | E | * | 5/1981 | Harris et al. ................. 106/253 |
| 4,265,973 | A | * | 5/1981 | Schuurink et al. ......... 428/424.8 |
| 5,037,475 | A | * | 8/1991 | Chida et al. ................. 106/403 |
| 5,589,535 | A | * | 12/1996 | Schwab et al. .............. 524/591 |
| 5,648,410 | A | * | 7/1997 | Hille et al. ................... 523/501 |
| 6,001,424 | A | * | 12/1999 | Lettmann et al. ......... 427/407.1 |
| 6,162,506 | A | * | 12/2000 | Lettmann et al. ......... 427/407.1 |
| 6,166,150 | A | * | 12/2000 | Wilke et al. ................. 525/453 |
| 6,168,865 | B1 |   | 1/2001 | Koster et al. ................ 428/418 |
| 6,187,384 | B1 | * | 2/2001 | Wilke et al. .............. 427/388.4 |
| 2002/0010298 | A1 | * | 1/2002 | Takayangi et al. ............. 528/1 |

FOREIGN PATENT DOCUMENTS

| DE | 42 26 243 | 2/1994 |
| EP | 1 158 032 | 1/2000 |
| WO | WO00/73388 | 12/2000 |

OTHER PUBLICATIONS

Technical Datasheet, Resydrol AM, XP002255728, Nov. 21, 2000.
Technical Datasheet, Resydrol AX, XP002255729, Nov. 21, 2000.
Technical Datasheet, Resydrol AF, XP002255730, Sep. 25, 2003.
English Abstract for DE 4226243, Feb. 10, 1994.

* cited by examiner

*Primary Examiner*—Randy Gulakowski
*Assistant Examiner*—John J Figueroa

(57) ABSTRACT

The present invention relates to basecoat materials comprising one or more water soluble, fatty acid modified epoxy esters and/or one or more fatty acid modified alkyd resins, to processes for preparing them, and to their use.

21 Claims, No Drawings

BASE PAINTS CONTAINING FATTY ACID-MODIFIED EPOXY ESTERS, METHODS FOR THE PRODUCTION THEREOF AND THEIR USE

This application is a National Phase Application of Patent Application PCT/EP2003/006883 filed on 28 Jun. 2003, which claims priority to DE 102 34 794.8 filed on 31 Jul. 2002.

In the context of the present invention, all percentages are by weight unless stated otherwise.

In the context of the present invention, "(meth)acrylate" is to be understood to embrace both acrylate and methacrylate at the same time.

The palette of different colors in paints and coating systems, especially in automotive paints and finishes, is increasing in size continuously. At the present time there exist around 25 000 different colors in automotive paints, with a continuing trend toward more and more —always new —colors. As part of the continuing production of new colors, there is a continuing need for new pigments and/or new combinations of a wide variety of pigments and quantities of pigment in the paints.

In the case of automotive basecoat materials based for example on PU/acrylic binders, certain colors may give rise to problems affecting the stability of shade following storage of the wet material or following its exposure to shearing in the paint circuit. The manifestation of this is such that paint material which has been applied following exposure by storage (room temperature or 40° C.) or following exposure by shearing (laboratory test by means of slow stirring) or following exposure in a paint circuit exhibits a visible change in shade as compared with the unexposed material. This can lead to problems on the customer's line, since in some cases there is no longer a color match with the shade original and with mounted components. It may also lead to problems with the primary release of various new colors, since shade fluctuations resulting from this problem are of course unwanted. Depending on the achievement of the pigment combination required for the shade original, shade alterations or pigment agglomeration may occur.

In view of the fact that automotive paints are required to conform to extremely stringent quality conditions and are of ever more complex composition, it is no longer readily possible to use dispersing additives, which have proven their worth in less complex paints and/or with individual pigments. Instead, ever more complicated tests must be conducted in order to determine appropriate dispersing additives for the particular shade.

It was an object of the present invention, therefore, to find a way of stabilizing basecoat materials for universal applicability, and, in particular, to prevent to a large extent—or in particular completely—the change in shade of paints on storage and/or shearing exposure as a function of the pigment combination.

A further object of the invention was to provide basecoat materials stabilized in this way.

It was likewise an object of the invention to provide multicoat systems comprising said basecoat materials.

These objects are achieved by a basecoat material comprising one or more water-soluble, fatty acid modified epoxy esters and/or one or more fatty acid modified alkyd resins.

The invention further provides a process for preparing basecoat materials, which involves adding one or more water-soluble, fatty acid modified epoxy esters and/or one or more fatty acid modified alkyd resins to a basecoat material.

The invention further provides for the use of the basecoat materials in coatings.

In one preferred embodiment of the invention, the basecoat material comprises as binders only one or more water-soluble, fatty acid modified epoxy esters and/or one or more fatty acid modified alkyd resins.

In another preferred embodiment, the basecoat material comprises from 1 to 10% by weight, based on solids, of one or more water-soluble, fatty acid modified epoxy esters and/or one or more fatty acid modified alkyd resins as an additive to existing formulas.

In all embodiments it is preferred if said water-soluble, fatty acid modified epoxy ester comprises Resydrol® AX250W/75 from Solutia.

The basecoat materials which can be stabilized using the water-soluble, fatty acid modified epoxy esters and/or fatty acid modified alkyd resins for use in accordance with the invention may be any customary basecoat materials.

Particularly advantageous results are achieved when using the water-soluble, fatty acid modified epoxy esters and/or fatty acid modified alkyd resins in basecoat materials comprising PU/acrylic binders.

One inventively preferred basecoat material comprises as its binder a polymer obtainable by polymerizing A) ethylenically unsaturated monomers or a mixture of ethylenically unsaturated monomers in the presence B) of a polyurethane resin having a number average molecular weight of from 200 to 30 000, preferably from 1 000 to 5 000, and containing on average per molecule from 0.05 to 1.1, preferably from 0.2 to 0.9, with particular preference from 0.3 to 0.7 polymerizable double bonds in an organic solvent or mixture of organic solvents and converting the resultant reaction product into an aqueous dispersion.

In order to prepare the binders that are used, in a first step well-known methods of polyurethane chemistry are used to prepare a polyurethane resin (B). The polyurethane resin is prepared from the following components:

a) a polyester- and/or polyetherpolyol having a number average molecular weight of 400 to 5 000, or a mixture of such polyester- and/or polyetherpolyols, b) a polyisocyanate or a mixture of polyisocyanates, c) if desired, a compound containing besides a polymerizable double bond at least one NCO-reactive group, or a mixture of such compounds, d) if desired, a compound containing in its molecule at least one isocyanate-reactive group and at least one group capable of forming anions, or a mixture of such compounds, e) if desired, a compound containing in its molecule at least one NCO-reactive group and at least one poly(oxyalkylene) group, or a mixture of such compounds, and, if desired, f) a hydroxyl- and/or amino-containing organic compound having a molecular weight of from 60 to 600, or a mixture of such compounds.

The polyurethane resin (B) is intended to have a number average molecular weight of from 200 to 30 000, preferably from 1 000 to 5 000, and to contain on average per molecule from 0.05 to 1.1, preferably from 0.2 to 0.9, with particular preference from 0.3 to 0.7 polymerizable double bonds. The polyurethane resin (B) preferably has an acid number of from 0 to 2.0. As the skilled worker will be aware, the molecular weight of the polyurethane resins may be controlled in particular by the proportion and functionality of the starting compounds (a) to (f) employed.

The polyurethane resins may be prepared either without solvent or in organic solvents.

The polyurethane resins can be prepared by reacting all of the starting compounds simultaneously. In many cases it is appropriate, however, to prepare the polyurethane resins in stages. It is possible, for example, to use components (a) and (b) to prepare an isocyanato-containing prepolymer which is then reacted further with component (c). Another possibility is to use components (a), (b), (c), and, if desired, (d) and (e) to prepare an isocyanato-containing prepolymer which can then be reacted with component (f) to give polyurethanes of higher molecular mass. In those cases where the compound used as component (c) contains only one isocyanate-reactive group, an isocyanato-containing precursor can be prepared in a first stage from (b) and (c) and can then be reacted further with the other components.

The reaction of components (a) to (f) is appropriately conducted in the presence of catalysts such as, for example, dibutyltin dilaurate, dibutyltin maleate, tertiary amines, etc.

The amounts of component (a), (b), (c), (d), (e), and (f) for use are a function of the target number average molecular weight and the target acid number. The polymerizable double bonds can be introduced into the polyurethane molecules by using components (a) containing polymerizable double bonds and/or by component (c). It is preferred to introduce the polymerizable double bonds by way of component (c).

As component (a) it is possible to use saturated and unsaturated polyester- and polyetherpolyols, especially polyester- and/or polyetherdiols, having a number average molecular weight of from 400 to 5 000. Suitable polyetherdiols are, for example, polyetherdiols of the general formula $H(-O-(CHR^1)_n-)_mOH$, in which $R^1$ is hydrogen or a lower, substituted or unsubstituted alkyl radical, n is from 2 to 6, preferably from 3 to 4, and m is from 2 to 100, preferably from 5 to 50. Examples include linear or branched polyetherdiols such as poly(oxyethylene) glycols, poly(oxypropylene) glycols, and poly(oxybutylene) glycols. The polyetherdiols selected should not introduce excessive amounts of ether groups, since otherwise the polymers formed start to swell in water. The preferred polyetherdiols are poly(oxypropylene) glycols in the molar mass range $M_n$ from 400 to 3 000.

Polyesterdiols are prepared by esterifying organic dicarboxylic acids or their anhydrides with organic diols or derive from a hydroxycarboxylic acid or a lactone. In order to prepare branched polyesterpolyols it is possible to make use to a small extent of polyols or polycarboxylic acid having a higher functionality. The dicarboxylic acids and diols may be linear or branched aliphatic, cycloaliphatic or aromatic dicarboxylic acids or diols.

The diols used for preparing the polyesters consist, for example, of alkylene glycols, such as ethylene glycol, propylene glycol, butylene glycol, butane-1,4-diol, hexane-1,6-diol, neopentyl glycol, and other diols, such as dimethylolcyclohexane. It is of course also possible to add small amounts of polyols, such as trimethylolpropane, glycerol, and pentaerythritol. The acid component of the polyester is composed primarily of low molecular mass dicarboxylic acids or their anhydrides having from 2 to 44, preferably from 4 to 36, carbon atoms in the molecule. Examples of suitable acids include o-phthalic acid, isophthalic acid, terephthalic acid, tetrahydrophthalic acid, cyclohexanedicarboxylic acid, succinic acid, adipic acid, azelaic acid, sebacic acid, maleic acid, fumaric acid, glutaric acid, hexachloroheptanedicarboxylic acid, tetrachlorophthalic acid and/or dimerized fatty acids. Instead of these acids it is also possible to use their anhydrides, where they exist. When forming polyesterpolyols it is also possible for relatively small amounts of carboxylic acids having 3 or more carboxyl groups to be present, examples being trimellitic anhydride or the adduct of maleic anhydride with unsaturated fatty acids.

It is also possible to use polyesterdiols obtained by reacting a lactone with a diol. They are notable for the presence of terminal hydroxyl groups and repeating polyester units of the formula $(-CO-(CHR^2)_n-CH_2-O)$. In this formula n is preferably from 4 to 6 and the substituent $R^2$ is hydrogen or an alkyl, cycloalkyl or alkoxy radical. No substituent contains more than 12 carbon atoms. The total number of carbon atoms in the substituent does not exceed 12 per lactone ring. Examples of such compounds are hydroxycaproic acid, hydroxybutyric acid, hydroxydecanoic acid and/or hydroxystearic acid.

Preference for the preparation of the polyesterdiols is given to unsubstituted ε-caprolactone, where n has the value 4 and all $R^2$ substituents are hydrogen. The reaction with lactone is started by low molecular mass polyols such as ethylene glycol, 1,3-propanediol, 1,4-butanediol, and dimethylolcyclohexane. It is also possible, however, to react other reaction components, such as ethylenediamine, alkyldialkanolamines or else urea, with caprolactone. Suitable diols of higher molecular mass also include polylactamdiols, which are prepared by reacting, say, ε-caprolactam with low molecular mass diols.

If polymerizable double bonds are to be introduced into the polyurethane molecules by way of component (a), then components (a) must be used which contain polymerizable double bonds. Examples of components (a) of this kind include polyesterpolyols, preferably polyesterdiols, which have been prepared using polycarboxylic acids and/or polyols containing polymerizable double bonds. Examples of polyols containing polymerizable double bonds include the following: trimethylolpropane monoallyl ether, glycerol monoallyl ether, pentaerythritol monoallyl ether, and pentaerythritol diallyl ether. Examples of polycarboxylic acids containing polymerizable double bonds include alkenedicarboxylic acids, maleic acid, and unsaturated dimerized fatty acids.

As component (b) it is possible to use aliphatic and/or cycloaliphatic and/or aromatic polyisocyanates. Examples of aromatic polyisocyanates include phenylene diisocyanate, tolylene diisocyanate, xylylene diisocyanate, biphenylene diisocyanate, naphthylene diisocyanate, and diphenylmethane diisocyanate. Because of their good stability toward ultraviolet light, (cyclo)aliphatic polyisocyanates result in products having little tendency to yellow. Examples of cycloaliphatic polyisocyanates are isophorone diisocyanate, cyclopentylene diisocyanate, and also the hydrogenation products of the aromatic diisocyanates, such as cyclohexylene diisocyanate, methylcyclohexylene diisocyanate, and dicyclohexylmethane diisocyanate. Aliphatic diisocyanates are compounds of the formula $OCN-(CR^3_2)_r-NCO$, in which r is an integer from 2 to 20, in particular from 6 to 8, and $R^3$, which can be identical or different, is hydrogen or a lower alkyl radical having from 1 to 8 carbon atoms, preferably 1 or 2 carbon atoms. Examples thereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate, and trimethylhexane diisocyanate. A further example of an aliphatic diisocyanate is tetramethylxylene diisocyanate. Particularly preferred diisocyanates are isophorone diisocyanate and dicyclohexylmethane diisocyanate.

As far as the functionality of the polyisocyanates is concerned component (b) must have a composition which ensures that the resulting polyurethane resin is not crosslinked. As well as diisocyanates, component (b) may also include a fraction of polyisocyanates having functionalities of more than two—such as triisocyanates, for example.

Products which have established themselves as triisocyanates are those formed by trimerization or oligomerization of diisocyanates or by reaction of diisocyanates with polyfunctional compounds containing OH or NH groups. These include, for example, the biuret of hexamethylene diisocyanate and water, the isocyanurate of hexamethylene diisocyanate or the adduct of isophorone diisocyanate with trimethylol propane. The average functionality may be lowered where appropriate by adding monoisocyanates. Examples of such chain-terminating monoisocyanates are phenyl isocyanate, cyclohexyl isocyanate, and stearyl isocyanate.

Component (c) serves to introduce polymerizable double bonds into the polyurethane resin molecules. As component (c) it is preferred to use a compound which contains at least two NCO-reactive groups and one polymerizable double bond. Compounds employed with particular preference as component (c) are those which in addition to a polymerizable double bond contain two NCO-reactive groups. Examples of NCO-reactive groups include —OH, —SH, >NH and —NH$_2$, preference being given to —OH, >NH, and —NH$_2$. Examples of compounds which can be used as component (c) include the following: hydroxy (meth)acrylates, especially hydroxyalkyl (meth)acrylates such as hydroxyethyl, hydroxypropyl, hydroxybutyl or hydroxyhexyl (meth)acrylate and 2,3-dihydroxypropyl (meth)acrylate, 2,3-dihydroxypropyl monoallyl ether, allyl 2,3-dihydroxypropanoate, glycerol mono(meth)acrylate, glycerol monoallyl ether, pentaerythritol mono(meth)acrylate, pentaerythritol di(meth)acrylate, pentaerythritol monoallyl ether, pentaerythritol diallyl ether, trimethylolpropane monoallyl ether, trimethylpropane mono (meth)acrylate, and trimethylolpropane diallyl ether. As component (c) it is preferred to use trimethylolpropane monoallyl ether, glycerol mono(meth)acrylate, pentaerythritol di(meth) acrylate, pentaerythritol diallyl ether, glycerol monoallyl ether, and trimethylolpropane mono(meth)acrylate. As component (c) it is particularly preferred to use trimethylolpropane monoallyl ether, glycerol monoallyl ether, and allyl 2,3-dihydroxypropanoate. It is preferred to incorporate components (c) containing at least two NCO-reactive groups into the polyurethane molecules at positions within the chain (not terminally).

The introduction of groups capable of forming anions into the polyurethane molecules takes place by way of the incorporation of compounds (d) into the polyurethane molecules, said compounds (d) containing in their molecule at least one group which is reactive toward isocyanate groups and one group which is capable of forming anions.

The amount of component (d) to be used can be calculated from the target acid number. As component (d) it is preferred to use compounds containing two isocyanate-reactive groups in their molecule. Suitable isocyanate-reactive groups are, in particular, hydroxyl groups, and also primary and/or secondary amino groups. Suitable groups capable of forming anions are carboxyl, sulfonic acid and/or phosphonic acid groups, carboxyl groups being preferred. As component (d) it is possible, for example, to use alkanoic acids having two substituents on the α carbon atom. The substituent may be a hydroxyl group, an alkyl group or, preferably, an alkylol group. These alkanoic acids have at least one, generally from 1 to 3, carboxyl groups per molecule. They have from two to about 25, preferably from 3 to 10, carbon atoms. Examples of component (d) include dihydroxypropionic acid, dihydroxysuccinic acid, and dihydroxybenzoic acid. One particularly preferred group of alkanoic acids are the α,α-dimethylolalkanoic acids of the general formula $R^4$—C(CH$_2$OH)$_2$COOH, in which $R^4$ stands for a hydrogen atom or an alkyl group having up to about 20 carbon atoms. Examples of such compounds are 2,2-dimethylolacetic acid, 2,2-dimethylolpropionic acid, 2,2-dimethylolbutyric acid, and 2,2-dimethylolpentanoic acid. The preferred dihydroxyalkanoic acid is 2,2-dimethylolpropionic acid. Examples of amino-containing compounds include α,δ-diaminovaleric acid, 3,4-diaminobenzoic acid, 2,4-diaminotoluenesulfonic acid, and 2,4-diaminodiphenyl ether sulfonic acid.

With the aid of component (e) it is possible to introduce poly(oxyalkylene) groups, as nonionic stabilizing groups, into the polyurethane molecules. As component (e) it is possible, for example, to make use of alkoxypoly(oxyalkylene) alcohols with the general formula R'O—(—CH$_2$—CHR"—O—)$_n$H, in which R' stands for an alkyl radical having from 1 to 6 carbon atoms, R" for a hydrogen atom or an alkyl radical having from 1 to 6 carbon atoms, and n for a number between 20 and 75.

The use of component (f) leads to an increase in the molecular weight of the polyurethane resins. As component (f) it is possible, for example, to use polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bis-phenol A, bisphenol F, neopentyl glycol, neopentyl glycol hydroxypivalate, hydroxyethylated or hydroxypropylated bisphenol A, hydrogenated bisphenol A, and mixtures thereof. The polyols are generally used in amounts of up to 30 percent by weight, preferably from 2 to 20 percent by weight, based on the amount of component (a) and (f) employed. As component (f) it is also possible to use diamines and/or polyamines containing primary and/or secondary amino groups. Polyamines are essentially alkylene polyamines having from 1 to 40 carbon atoms, preferably from about 2 to 15 carbon atoms. They may carry substituents which have no hydrogen atoms which are reactive with isocyanate groups. Examples are polyamines with a linear or branched aliphatic, cycloaliphatic or aromatic structure which contain at least two primary amino groups. Diamines include hydrazine, ethylenediamine, propylenediamine, 1,4-butylenediamine, piperazine, 1,4-cyclohexyl methylamine, hexamethylene-1,6-diamine, trimethylhexamethylenediamine, menthanediamine, isophoronediamine, 4,4'-diaminodicyclohexylmethane, and aminoethylethanolamine. Preferred diamines are hydrazine, alkyl- or cycloalkyldiamines such as propylenediamine and 1-amino-3-aminomethyl-3,5,5-trimethylcyclohexane. As component (f) it is also possible to use polyamines containing more than two amino groups in the molecule. In these cases, however, it must be ensured—by using monoamines as well, for example—that the polyurethane resins obtained are not crosslinked. Polyamines of this kind which can be used include diethylenetriamine, triethylenetetramine, dipropylenediamine, and dibutylenetriamine. An example of a monoamine is ethylhexylamine.

The binders are prepared by preparing a solution of the polyurethane resin (B) in an organic solvent or organic solvent mixture and in the resulting solution polymerizing ethylenically unsaturated monomers or a mixture of ethylenically unsaturated monomers in a free-radical polymerization, and converting the resulting reaction product into an aqueous dispersion. Preference is given to using water-miscible organic solvents. Examples of solvents which can be used include butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, and 3-methyl-3-methoxybutanol, or mixtures of these solvents.

Preference is given to ketones, such as acetone, methyl ethyl ketone, diethyl ketone, and methyl isobutyl ketone, for example.

The free-radical polymerization is conducted at temperatures from 80 to 160° C., preferably from 100 to 160° C., in the abovementioned organic solvents or solvent mixtures.

Examples of polymerization initiators which can be used are free-radical initiators, such as benzoyl peroxide, azobisisobutyronitrile, and t-butyl perbenzoate, for example.

In the course of the polymerization there may also be grafting reactions between the polyurethane resin (B) and component (A). Components (A) and (B) are used in a weight ratio of from 1:10 to 10:1, preferably from 1:2 to 2:1, with particular preference 1:1.

As ethylenically unsaturated monomers it is possible to use virtually all free-radically polymerizable monomers subject to the restrictions that are usual for copolymerizations and which are defined by the Q and e scheme of Alfrey and Price and/or by the copolymerization parameters (cf. e.g. Brandrup and Immergut, Polymer Handbook, 2nd ed., John Wiley+ Sons, New York (1975)).

As ethylenically unsaturated monomers it is possible to use the following:
(i) aliphatic or cycloaliphatic esters of acrylic acid or methacrylic acid or a mixture of such esters and
(ii) ethylenically unsaturated monomers carrying at least one hydroxyl group in the molecule, or a mixture of such monomers, and
(iii) ethylenically unsaturated monomers carrying at least one carboxyl group in the molecule, or a mixture of such monomers, and
(iv) further ethylenically unsaturated monomers, other than (i), (ii), and (iii), or a mixture of such monomers, and also
(v) polyunsaturated monomers, especially ethylenically polyunsaturated monomers.

The abovementioned monomers are used preferably as mixtures, component (i) being used in an amount from 40 to 100%, preferably from 60 to 90% by weight, component (ii) in an amount from 0 to 20%, preferably from 3 to 12% by weight, component (iii) in an amount from 0 to 30%, preferably from 5 to 15% by weight, component (iv) in an amount from 0 to 30%, preferably from 0 to 10% by weight, and component (v) in an amount from 0 to 5%, preferably 0% by weight, the sum of the weight fractions of (i), (ii), (iii), (iv) and (v) always making 100% by weight.

As component (i) it is possible, for example, to use the following: cyclohexyl acrylate, cyclohexyl methacrylate, alkyl acrylates and alkyl methacrylates having up to 20 carbon atoms in the alkyl radical, such as methyl, ethyl, propyl, butyl, hexyl, ethylhexyl, stearyl, and lauryl acrylate and methacrylate, or mixtures of these monomers.

As component (ii) it is possible, for example, to use the following: hydroxyalkyl esters of acrylic acid, methacrylic acid or another α,β-ethylenically unsaturated carboxylic acid. These esters may derive from an alkylene glycol which is esterified with the acid or may be obtained by reacting the acid with an alkylene oxide. As component (ii) it is preferred to use hydroxyalkyl esters of acrylic acid and methacrylic acid in which the hydroxyalkyl group contains up to 4 carbon atoms, or mixtures of these hydroxyalkyl esters. Examples of such hydroxyalkyl esters include 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl acrylate or 4-hydroxybutyl methacrylate. Corresponding esters of other unsaturated acids, such as ethacrylic acid, crotonic acid, and similar acids having up to about 6 carbon atoms per molecule, may also be used.

As component (iii) it is preferred to use acrylic acid and/or methacrylic acid. It is, however, also possible to use other ethylenically unsaturated acids having up to 6 carbon atoms in the molecule. Examples of such acids include ethacrylic acid, crotonic acid, maleic acid, fumaric acid, and itaconic acid.

As component (iv) it is possible, for example, to use the following: vinylaromatic hydrocarbons, such as styrene, α-alkylstyrene, and vinyltoluene, acrylamide and methacrylamide, and acrylonitrile and methacrylonitrile, or mixtures of these monomers.

As components (v) it is possible to use compounds containing in their molecule at least two free-radically polymerizable double bonds. Examples include the following: divinylbenzene, p-methyldivinylbenzene, o-nonyldivinylbenzene, ethanediol di(meth)acrylate, 1,4-butanediol di(meth)acrylate, 1,6-hexanediol di(meth)acrylate, trimethylolpropane tri(meth)acrylate, pentaerythritol di(meth)acrylate, allyl methacrylate, diallyl phthalate, butanediol divinyl ether, divinylethyleneurea, divinylpropyleneurea, diallyl maleate, etc.

Preference is given to using difunctional unsaturated monomers such as butanediol diacrylate or hexanediol diacrylate. When glycidyl methacrylate and methacrylic acid are used, the corresponding glycerol dimethacrylate is formed automatically during the polymerization. The nature and amount of polyunsaturated monomers must be carefully attuned to the reaction conditions (catalysts, reaction temperature, solvents) so as to prevent gelling. The amount of polyunsaturated monomers added serves to raise the average molar mass without instances of gel formation. It is, however, preferred not to add any polyunsaturated monomer.

The polymers prepared from (A) and (B) must contain groups capable of forming anions which prior to or during the transfer of the polymers from the organic solvent or solvent mixture to water are neutralized and make it possible for stable aqueous dispersions to form. In addition to the groups capable of forming anions, the polymers in question may also contain nonionic stabilizing groups such as, for example, poly(oxyalkylene) groups, especially poly(oxyethylene) and/or poly(oxypropylene) and/or poly(oxyethylene)(oxypropylene) groups. The amount of the groups capable of forming anions present in the polymers prepared from (A) and (B) should be sufficient for the polymers to have an acid number of from 5 to 200, preferably from 10 to 40, with particular preference from 15 to 30. The groups capable of forming anions may be introduced into the polymers in question by means, for example, of components (d) and (iii). The groups capable of forming anions may be present exclusively in component (A) or exclusively in component (B) or even both in component (A) and component (B). It is preferred for from 50 to 100%, preferably from 70 to 100%, with particular preference 100% of the groups capable of forming anions to be present in component (A).

Poly(oxyalkylene) groups can be introduced into the polymers by way of component (e) or ethylenically unsaturated monomers which contain at least one poly(oxyalkylene) group (e.g., poly(oxyethylene) (meth)acrylates). The polymers should not contain excessive amounts of poly(oxyalkylene) groups, since otherwise the moisture resistance of the paint films may be reduced. The amount of poly(oxyalkylene) groups can be from 1 to 10% by weight, preferably from 1 to 5% by weight (based on the weight of the polymer prepared from (A) and (B)).

The polymers prepared from (A) and (B) ought preferably not to contain any nonionic stabilizing groups.

The polymers prepared from (A) and (B) are to have a hydroxyl number of preferably from 0 to 100, with particular preference from 20 to 80. The number-average molecular weight of the polymers is to be preferably from 2 000 to 20 000, with particular preference from 5 000 to 12 000.

Particularly preferred polymers are the polymers prepared from (A) and (B) that have a polymolecularity index Q of from 5 to 90, preferably from 10 to 30. The polymolecularity index is the ratio $M_w:M_n$ where $M_w$ represents the weight average and $M_n$ the number average molecular weight.

The polymolecularity index may be influenced, for example, by controlled use of regulators and by the nature of the solvents employed. Moreover, Q is influenced by the amount of polymerizable double bonds in component (B). The smaller the amount of regulator used and the amount of solvents used which can function as regulators, the greater Q becomes. The lower the level of polymerizable double bonds in component (B), the greater Q becomes.

Q can be determined by gel permeation chromatography using a polystyrene standard.

After the end of polymerization of component (A), the resulting polymer is at least partly neutralized and dispersed in water.

For the neutralization it is possible to use both organic bases and inorganic bases, such as ammonia and hydrazine. Preference is given to using primary, secondary, and tertiary amines, such as ethylamine, propylamine, dimethylamine, dibutylamine, cyclohexylamine, benzylamine, morpholine, piperidine, and triethanolamine. With particular preference tertiary amines are used as neutralizing agents, especially dimethylethanolamine, triethylamine, tripropylamine, and tributylamine.

Where appropriate, some or, preferably, all of the organic solvent can be distilled off from the resultant aqueous binder dispersions. The binder dispersions contain polymer particles whose average size is situated between 10 and 500 nm, preferably between 60 to 150 nm (measurement method: laser light scattering; instrument: Malvern Autosizer 2 C).

From the binder dispersions in question it is possible to use well-known methods to prepare aqueous paints, especially aqueous solid-color basecoat materials and aqueous metallic basecoat materials. The basecoat materials can be used for refinish purposes as well and may be overcoated both with aqueous and with conventional clearcoat materials and powder coating materials.

In addition to the binders described, the basecoat materials may comprise further compatible, water dilutable synthetic resins, such as amino resins, polyurethane resins, polyacrylate resins, polyesters, and polyethers, for example.

The basecoat materials contain preferably from 5 to 90%, with particular preference from 40 to 70%, by weight of the binder described, the percentages by weight being based on the overall solids content of the basecoat materials.

The basecoat materials of the invention generally have a solids content of from about 15 to 50% by weight. The solids content varies with the intended use of the coating compositions. For metallic paints, for example, it is preferably from 17 to 25% by weight. For solid-color paints it is higher, from 30 to 45% by weight for example.

The basecoat materials of the invention are generally adjusted to a pH of between 6.5 and 9.0. The pH may be set using customary amines, such as ammonia, triethylamine, dimethylaminoethanol, and N-methylmorpholine, for example.

Using the basecoat materials of the invention it is possible to produce high-quality paint systems even without overcoating with a transparent topcoat material. The single-coat finishes obtained in this way are notable in particular for high gloss, good technical-mechanical properties, and high condensation resistance.

The basecoat materials of the invention permit, surprisingly, the operationally reliable formulation of basecoat shades presently rated as being not operationally reliable. Accordingly, the storage and processing of these basecoat materials have been simplified and improved, surprisingly, as compared with the existing basecoat materials.

Starting from the known state of the art it could not have been expected that the incorporation of one or more water soluble, fatty acid modified epoxy esters and/or one or more fatty acid modified alkyd resins into basecoat materials would give basecoat materials featuring reduced or absent change in shade on storage and/or shearing exposure as a function of the pigment combination.

Equally surprising was that the shade stabilization occurring with the basecoat materials of the invention is substantially independent of whether and, if so, how much rheological additive is added to the basecoat material.

The process of the invention for introducing the one or more water soluble, fatty acid modified epoxy esters and/or the one or more fatty acid modified alkyd resins into basecoat materials has no special features. Instead it is possible to add the one or more water soluble, fatty acid modified epoxy esters and/or the one or more fatty acid modified alkyd resins at any desired point in the preparation of the basecoat material. It is, however, preferred to add the one or more water soluble, fatty acid modified epoxy esters and/or the one or more fatty acid modified alkyd resins together with the pigment or pigments. In particular, it is preferred first to mix the one or more water soluble, fatty acid modified epoxy esters and/or the one or more fatty acid modified alkyd resins and the pigment or pigments with one another, separately from the other components of the basecoat material, and then to add the resulting mixture to the remaining basecoat material.

Mixing of the one or more water soluble, fatty acid modified epoxy esters and/or the one or more fatty acid modified alkyd resins with the basecoat material or with the pigment or pigments per se takes place in accordance with widely and well-known methods, e.g., stirring, where appropriate with the assistance of mills.

The basecoat materials of the invention can be overcoated with aqueous, conventional or powder clearcoat materials.

Examples of clearcoat materials which can be used include the following:

suitable clearcoat materials for producing the clearcoats include in principle all customary and known one-component (1K), two-component (2K) or multicomponent (3K, 4K) clearcoat materials, powder clearcoat materials, powder slurry clearcoat materials, and UV curable clearcoat materials.

Thermally curable one-component (1K), two-component (2K) or multicomponent (3K, 4K) clearcoat materials are known from European patent applications DE 42 04 518 A1, EP 0 594 068 A1, EP 0 594 071 A1, EP 0 594 142 A1, EP 0 604 992 A1 or EP 0 596 460 A1, from international patent applications WO 94/10211, WO 94/10212, WO 94/10213, WO 94/22969 or WO 92/22615, or from American patents U.S. Pat. Nos. 5,474,811, 5,356,669 or U.S. Pat. No. 5,605,965.

One-component (1K) clearcoat materials comprise, as is known, hydroxyl-containing binders and crosslinking agents such as blocked polyisocyanates, tris(alkoxycarbonylamino) triazines and/or amino resins. In another variant they comprise as binders polymers containing pendant carbamate and/or allophanate groups, and carbamate- and/or allophanate-modified amino resin crosslinking agents (cf. American patents U.S. Pat. Nos. 5,474,811, 5,356,669 or U.S. Pat. No. 5,605,965, international patent applications WO 94/10211, WO 94/10212 or WO 94/10213, or European patent applications EP 0 594 068 A1, EP 0 594 071 A1 or EP 0 594 142 A1).

Two-component (2K) or multicomponent (3K, 4K) clearcoat materials comprise essential constituents which, as is known, comprise hydroxyl-containing binders and polyisocyanate crosslinking agents, which are stored separately up until they are used.

Thermally curable powder clearcoat materials are known, for example, from German patent application DE 42 22 194 A1, from the BASF Lacke+Farben AG product information "Pulverlacke", 1990, or from the BASF Coatings AG brochure "Pulverlacke, Pulverlacke für industrielle Anwendungen", January 2000.

Essential constituents of powder clearcoat materials are known to comprise epoxy-functional binders and polycarboxylic acid crosslinking agents.

Examples of suitable powder slurry clearcoat materials are known from the U.S. patent U.S. Pat. No. 4,268,542 and from patent applications DE 195 40 977 A1, DE 195 18 392 A1, DE 196 17 086 A1, DE-A-196 13 547, EP 0 652 264 A1, DE 196 18 657 A1, DE 196 52 813 A1, DE 196 17 086 A1 or DE 198 14 471 A1.

Powder slurry clearcoat materials familiarly comprise powder clearcoat materials in dispersion in an aqueous medium.

Clearcoat materials, powder clearcoat materials and powder slurry clearcoat materials that are curable with actinic radiation are disclosed, for example, in European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, German patent applications DE 198 35 206 A1, DE 197 09 467 A1, DE 42 03 278 A1, DE 33 16 593 A1, DE 38 36 370 A1, DE 24 36 186 A1, or DE 20 03 579 B1, international patent applications WO 97/46549 or WO 99/14254, or American patents U.S. Pat. Nos. 5,824,373, 4,675,234, 4,634,602, 4,424,252, 4,208,313, 4,163,810, 4,129,488, 4,064,161 or U.S. Pat. No. 3,974,303.

Dual-cure (curable both thermally and with actinic radiation) clearcoat materials, powder clearcoat materials, and powder slurry clearcoat materials are disclosed, for example, in patent applications DE 198 18 735 A1, WO 98/40170, DE 199 08 013 A1, DE 199 08 018 A1, EP 0 844 286 A1 or EP 0 928 800 A1.

In general, the clearcoat materials are applied in a wet film thickness such that curing thereof results in clearcoats having the film thicknesses necessary and advantageous for their functions. These thicknesses are preferably from 10 to 100 µm, more preferably from 15 to 80 µm, with particular preference from 20 to 75 µm, and in particular from 25 to 70 µm.

In the context of the present invention the basecoat material may include the customary pigments, fillers, and nanoparticles. The level of pigmentation is within customary ranges.

Examples of suitable effect pigments are metal flake pigments such as commercial aluminum bronzes, aluminum bronzes chromated in accordance with DE 36 36 183 A1, and commercial stainless steel bronzes, and also nonmetallic effect pigments, such as pearlescent pigments and interference pigments, for example, platelet-shaped effect pigments based on iron oxide with a shade ranging from pink to brownish red, or liquid-crystalline effect pigments. For further details refer to Römpp Lexikon Lacke und Druckfarben, Georg Thieme Verlag, 1998, pages 176, "effect pigments", and pages 380 and 381, "metal oxide-mica pigments" to "metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A or U.S. Pat. No. 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details refer to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azo pigments", and page 379 "metal complex pigments".

Examples of fluorescent pigments (daylight-fluorescent pigments) are bis(azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys such as aluminum, zinc, copper, bronze or brass.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details refer to Römpp Lexikon Lacke und Druckfarben, Georg Thieme Verlag, 1998, pages 250 et seq., "fillers".

Preference is given to employing mica and talc if the intention is to enhance the scratch resistance of the coatings produced from the basecoat materials of the invention.

It is also of advantage to use mixtures of platelet-shaped inorganic fillers such as talc or mica and non-platelet-shaped inorganic fillers such as chalk, dolomite, calcium sulfates or barium sulfate, since by this means it is possible to adjust the viscosity and rheology very effectively.

Examples of suitable transparent fillers are those based on silica, alumina or zirconium oxide.

Suitable nanoparticles are selected from the group consisting of hydrophilic and hydrophobic, especially hydrophilic, nanoparticles based on silica, alumina, zinc oxide, zirconium oxide, and the polyacids and heteropolyacids of transition metals, preferably of molybdenum and tungsten, having a primary particle size <50 nm, more preferably from 5 to 50 nm, in particular from 10 to 30 nm. The hydrophilic nanoparticles preferably have no flatting effect. Particular preference is given to using silica-based nanoparticles.

Very particular preference is given to using hydrophilic pyrogenic silicas whose agglomerates and aggregates have a chainlike structure and which can be prepared by the flame hydrolysis of silicon tetrachloride in an oxyhydrogen flame. They are sold, for example, by Degussa under the brand name Aerosil®. Very particular preference is also given to using precipitated waterglasses, such as nanohectorites, which are sold, for example, by Südchemie under the brand name Optigel® or by Laporte under the brand name Laponite®.

The coating materials of the invention may further comprise customary organic solvents. Their fraction is kept as low as possible. It is, for example, below 15% by weight.

Examples of suitable additional ingredients which may be present in the basecoat material of the invention are crosslinking agents, additional binders curable thermally and/or with actinic radiation, reactive diluents for the thermal cure or the actinic radiation cure, UV absorbers, light stabilizers, free-radical scavengers, free-radical polymerization initiators, thermal crosslinking catalysts, photoinitiators and photocoinitiators, devolatilizers, slip additives, polymerization inhibitors, defoamers, emulsifiers, wetting agents, dispersants, adhesion promoters, leveling agents, film-forming auxiliaries, additional rheology control additives (thickeners), flame retardants, siccatives, dryers, antiskinning agents, corrosion inhibitors, waxes, and flatting agents.

Examples of suitable crosslinking agents are amino resins, as described for example in Römpp Lexikon Lacke und Druckfarben, Georg Thieme Verlag, 1998, page 29, "amino resins", in the textbook "Lackadditive [additives for coatings]" by Johan Bieleman, Wiley-VCH, Weinheim, N.Y., 1998, pages 242 ff., in the book "Paints, Coatings and Solvents", second, completely revised, edition, edited by D. Stoye and W. Freitag, Wiley-VCH, Weinheim, N.Y., 1998, pages 80 ff., in the patents U.S. Pat. No. 4,710,542 A1 or EP-B-0 245 700 A1, and the article by B. Singh and coworkers, "Carbamyl-methylated melamines, novel crosslinkers for the coatings industry", in Advanced Organic Coatings Science and Technology Series, 1991, volume 13, pages 193 to 207; carboxyl-containing compounds or resins, as described for example in patent DE 196 52 813 A1; epoxy-functional compounds or resins, as described for example in patents EP 0 299 420 A1, DE 22 14 650 B1, DE 27 49 576 B1, U.S. Pat. No. 4,091,048 A1 or U.S. Pat. No. 3,781,379 A1; nonblocked and blocked polyisocyanates, as described for example in patents U.S. Pat. No. 4,444,954 A1, DE 196 17 086 A1, DE 196 31 269 A1, EP 0 004 571 A1 or EP 0 582 051 A1, and/or tris(alkoxycarbonylamino)triazines, as described in patents U.S. Pat. No. 4,939,213 A1, U.S. Pat. No. 5,084,541 A1, U.S. Pat. No. 5,288,865 A1 or EP 0 604 922 A1.

Preferred crosslinking agents used are hexamethoxy-methylated melamine resins such as Cymel 303 from Cytec or methanol-etherified "high-imino" melamine resins such as Cymel 327 from Cytec, for example.

It is also possible to use melamine resins with mixed etherification.

Examples of suitable additional binders are oligomeric and polymeric, thermally curable, linear and/or branched and/or block, comb and/or random poly(meth)acrylates or acrylic copolymers, especially those described in patent DE 197 36 535 A1, polyesters, especially those described in patents DE 40 09 858 A1 or DE 44 37 535 A1, alkyds, acrylated polyesters, polylactones, polycarbonates, polyethers, epoxy resin-amine adducts, (meth)acrylate diols, partially saponified polyvinyl esters or polyureas and/or radiation curable binders such as (meth)acryloyl-functional (meth)acrylate copolymers, polyether acrylates, polyester acrylates, unsaturated polyesters, epoxy acrylates, urethane acrylates, amino acrylates, melamine acrylates, silicone acrylates, isocyanato acrylates, and the corresponding methacrylates.

Examples of suitable thermally curable reactive diluents are positionally isomeric diethyloctanediols or hydroxyl-containing hyperbranched compounds or dendrimers, as described in patent applications DE 198 09 643 A1, DE 198 40 605 A1 or DE 198 05 421 A1.

Examples of suitable reactive diluents curable with actinic radiation are described in Römpp Lexikon Lacke und Druckfarben, Georg Thieme Verlag, Stuttgart, N.Y., 1998, on page 491 under the entry "reactive diluents".

Examples of suitable photoinitiators and coinitiators are described in Römpp Lexikon Lacke und Druckfarben, Georg Thieme Verlag, Stuttgart, N.Y., 1998, pages 444 to 446.

Examples of suitable light stabilizers are HALS compounds, benzotriazoles or oxalanilides.

Examples of suitable thermolabile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers.

Examples of suitable crosslinking catalysts are dibutyltin dilaurate, lithium decanoate or zinc octoate or amine-blocked organic sulfonic acids.

An example of a suitable devolatilizer is diazadicycloundecane.

Examples of suitable emulsifiers are nonionic emulsifiers such as alkoxylated alkanols, polyols, phenols, and alkylphenols, or anionic emulsifiers such as alkali metal salts or ammonium salts of alkanecarboxylic acids, alkanesulfonic acids, and sulfo acids of alkoxylated alkanols, polyols, phenols, and alkylphenols.

Examples of suitable wetting agents are siloxanes, fluorine compounds, carboxylic monoesters, phosphates, polyacrylic acids and their copolymers, or polyurethanes.

An example of a suitable adhesion promoter is tricyclodecane dimethanol.

Examples of suitable film-forming auxiliaries are cellulose derivatives.

Examples of suitable additional rheology control additives are those known from patents WO 94/22968, EP 0 276 501 A1, EP 0 249 201 A1 or WO 97/12945; crosslinked polymeric microparticles, as disclosed for example in EP 0 008 127 A1; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives or hydrophobically modified polyacrylates; or associative thickeners based on polyurethane, as described in Römpp Lexikon Lacke und Druckfarben, Georg Thieme Verlag, Stuttgart, N.Y., 1998, "thickeners", pages 599 to 600, and the textbook "Lackadditive" by Johan Bieleman, Wiley-VCH, Weinheim, N.Y., 1998, pages 51 to 59 and 65.

Preferred thickeners are Aerosil from Degussa and Laponite from Laporte, which may where appropriate be replaced in whole or in part by acrylic thickeners, preferably Viscalex HV30 from Ciba and/or polyurethane-based thickeners.

It is also possible to add crosslinked polymeric microparticles, as disclosed for example in EP-A-38 127, and/or customary organic or inorganic additives to the basecoat materials of the invention. For example, effective thickeners include water soluble cellulose ethers, such as hydroxyethylcellulose, methylcellulose or carboxymethylcellulose, and also synthetic polymers containing ionic and/or associative groups, such as polyvinyl alcohol, poly(meth)acrylamide, poly(meth)acrylic acid, polyvinyl-pyrrolidone, styrene-maleic anhydride or ethylene-maleic anhydride copolymers and their derivatives or else hydrophobically fatty acid modified ethoxylated urethanes or polyacrylates, and also carboxyl-containing polyacrylate copolymers having an acid number of from 60 to 780, preferably from 200 to 500.

Examples of suitable further ingredients not detailed above are known from the textbook "Lackadditive" by Johan Bieleman, Wiley-VCH, Weinheim, N.Y., 1998.

In one preferred embodiment of the basecoat materials of the invention they are solid color basecoat materials.

The basecoat materials of the invention may be applied to any known substrates which are customarily coated with basecoat materials. Examples of such substrates are primed and unprimed plastics, primed and unprimed metals, wood, paper, and pretreated or unpretreated existing finishes.

The basecoat materials of the invention are preferably part of multicoat systems. Depending on the intended use, however, they may also be used alone, without further coating materials, as self-standing topcoat materials.

Preference is given to their use in multicoat systems.

The multicoat systems comprising the basecoat materials of the invention may be used for any desired substrates, preference being given to their use for industrial coatings and automotive paint systems, especially automotive paint systems.

One preferred embodiment of the multicoat systems in this context is that of basecoat-clearcoat systems.

Particular advantages are displayed by the coating material of the invention in its utility as an aqueous basecoat material as part of the wet-on-wet technique, in which the aqueous basecoat material is applied to the primed or unprimed substrate and then the aqueous basecoat film is dried but not cured, a clearcoat material is applied to the aqueous basecoat film, and the resultant clearcoat film is cured together with the aqueous basecoat film, thermally or both thermally and with actinic radiation (dual cure).

In the case of a primed substrate the primer, especially the surfacer film, can be overcoated in the uncured or only part-cured state with the aqueous basecoat material of the invention and with the clearcoat material, after which all three films are baked together.

In another variant of the wet-on-wet technique, a first aqueous basecoat film is applied to an uncured or only part-cured primer, particularly an electrocoat film, which is present on the substrate, and then the two films are jointly cured thermally. The resulting coating is then overcoated, as described above, with a second aqueous basecoat and a clearcoat. It is possible for the first or second aqueous basecoat to be prepared from an aqueous basecoat material of the invention. It is also possible for both aqueous basecoats to be prepared from one and the same aqueous basecoat material of the invention or from two materially different aqueous basecoat materials of the invention.

The multicoat systems of the invention may be applied to any desired substrates, such as metal, wood, plastic or paper, for example.

The basecoat materials and/or multicoat systems of the invention may be applied directly or, as is customary in the auto industry, following the application of an electrocoat primer and a surfacer.

The coating materials of the invention may be applied by any customary application technique, such as spraying, knife coating, spreading, flow coating, dipping, impregnating, trickling or rolling, for example, preferably by electrostatic and pneumatic spraying. In this case the substrate to be coated may itself be at rest, with the application equipment or unit being moved. Alternatively, the substrate to be coated, a coil for example, can be moved, with the application unit being at rest relative to the substrate or being moved appropriately. Where the coating materials of the invention include ingredients which can be activated with actinic radiation, application is conducted preferably in the absence of light.

EXAMPLES

1. Preparation of Inventive Binder Dispersions 1.1 Binder Dispersion A

In a 5 l reaction vessel with stirrer, reflux condenser and 2 feed vessels 275 g of isophorone diisocyanate are added to a mixture of 336 g of a polyester having a number average molecular weight of 630 based on adipic acid, hexanediol and neopentyl glycol (molar ratio 1:0.5:1), 31 g of neopentyl glycol, 27.8 g of trimethylolpropane monoallyl ether, 0.45 g of dibutyltin dilaurate and 279.7 g of methyl ethyl ketone. The reaction mixture is subsequently heated under nitrogen at a temperature of 80° C. At an NCO content of 2.2%, 66.7 g of trimethylolpropane are added to the reaction mixture and the reaction is continued until isocyanate groups can no longer be detected. Thereafter 248.9 g of methyl ethyl ketone are added.

At a temperature of 82° C. a mixture of 312.5 g of n-butyl acrylate, 3123 g of methyl methacrylate, 74.7 g of hydroxypropyl methacrylate and 58.4 g of acrylic acid is then added to the reaction mixture over the course of 3 hours. At the same time 175 g of a 13 percent strength solution of 2,2'-azobis(methylbutyronitrile) in methyl ethyl ketone are metered in over the course of 3.5 hours.

After a further 2.5 hours at 82° C., 56.9 g of dimethylethanolamine and 2242 g of deionized water are added.

Removal of the methyl ethyl ketone under reduced pressure gives a 40 percent, aqueous, coagulum-free dispersion having a pH of 8.1 and an average particle diameter of 100 nm.

1.2 Binder Dispersion B

In a 5 l reaction vessel with stirrer, reflux condenser and 2 feed vessels 289.5 g of isophorone diisocyanate are added to a mixture of 353.5 g of a polyester having a number average molecular weight of 630 based on adipic acid, maleic anhydride, hexanediol and ethylbutylpropane-1,3-diol (molar ratio 0.9:0.1:0.5:1), 39.4 g of neopentyl glycol, 18.0 g of trimethylolpropane monoallyl ether, 0.45 g of dibutyltin dilaurate and 330 g of methyl isobutyl ketone. The reaction mixture is subsequently heated under nitrogen at a temperature of 105° C. At an NCO content of 2.2%, 69.6 g of trimethylolpropane are added to the reaction mixture. At a residual NCO content of <0.05%, 150.2 g of methyl isobutyl ketone are added.

At a temperature of 105° C. a mixture of 417.4 g of n-butyl acrylate, 217.4 g of methyl methacrylate, 75.9 g of hydroxypropyl methacrylate and 59.4 g of acrylic acid is then added to the reaction mixture over the course of 3 hours. At the same time 179.9 g of an 11.7% strength solution of t-butyl perethylhexanoate in methyl isobutyl ketone are metered in over the course of 33 hours.

After a further 2.5 hours at 105° C., 513 g of dimethylethanolamine and 2310 g of deionized water are added.

Removal of the methyl isobutyl ketone under reduced pressure gives a 43%, aqueous, coagulum-free dispersion having a pH of 7.9 and an average particle diameter of 100 nm.

1.3 Binder Dispersion C

In a 6 l reaction vessel with stirrer, reflux condenser and 2 feed vessels 285.4 g of isophorone diisocyanate are added to a mixture of 348.8 g of a polyester having a number average molecular weight of 630 based on adipic acid, hexanediol and ethylbutylpropane-1,3-diol (molar ratio 1:0.5:1), 41.4 g of dimethylolpropionic acid, 28.9 g of trimethylolpropane monoallyl ether and 330.9 g of methyl ethyl ketone.

The reaction mixture is subsequently heated under nitrogen at a temperature of 80° C. At an NCO content of 2.1%, 67.4 g of trimethylolpropane are added to the reaction mixture.

At a reaction temperature of 82° C. a mixture of 320.6 g of n-butyl acrylate, 362 g of methyl methacrylate, 76.7 g of hydroxypropyl methacrylate and 273 g of acrylic acid is then added over the course of 3 hours. At the same time 186.4 g of a 12% strength solution of 2,2'-azobis(methylbutyronitrile) in methyl ethyl ketone are metered in over the course of 3.5 hours.

After a further 2.5 hours at 105° C., 50.9 g of dimethylethanolamine and 3480.2 g of deionized water are added.

Removal of the methyl ethyl ketone under reduced pressure gives a 30%, aqueous, coagulum-free dispersion having a pH of 7.9 and an average particle diameter of 70 nm.

Formulating Examples

By mixing the abovementioned binder dispersion with the further ingredients set out in the table below, the following coatings are obtained. The comparative examples contain no fatty acid modified epoxy esters. The sequence in which the ingredients are mixed is unimportant and familiar to the skilled worker.

|  | Comparative example 1 (lemon yellow) | Example 1 (lemon yellow) | Comparative example 2 (mint green) | Example 2 (mint green) |
|---|---|---|---|---|
| Binder |  |  |  |  |
| Cymel 303[a] | 3.10 | 3.04 | 2.85 | 2.89 |
| Cymel 327[a] | 4.42 | 4.33 | 4.06 | 4.11 |
| Binder from preparation example 1.1[a] | 13.76 | 12.99 | 15.81 | 14.04 |
| Resydrol AX250W/75EP[a] | 0.00 | 2.37 | 0.00 | 2.47 |
| Total | 21.28 | 22.73 | 22.72 | 23.51 |

-continued

|  | Comparative example 1 (lemon yellow) | Example 1 (lemon yellow) | Comparative example 2 (mint green) | Example 2 (mint green) |
|---|---|---|---|---|
| Fillers |  |  |  |  |
| Aerosil R972 | 0.99 | 0.97 | 1.02 | 1.03 |
| Total | 0.99 | 0.97 | 1.02 | 1.03 |
| Color pigments |  |  |  |  |
| Titanium rutile | 15.32 | 15.01 | 2.87 | 2.91 |
| Sandorin yellow 6GL | 3.19 | 3.13 | — | — |
| Carbon black Monarch 1400 | 0.01 | 0.01 | — | — |
| Hostaperm yellow H3G | — | — | 1.77 | 1.79 |
| Novoperm orange HL70 | — | — | 0.02 | 0.02 |
| Palomar blue B4806 | — | — | 0.15 | 0.15 |
| Heliogen green L9361 | — | — | 4.99 | 5.05 |
| Total | 18.53 | 18.15 | 9.80 | 9.93 |
| Solvents |  |  |  |  |
| Water, dist. | 39.64 | 38.22 | 44.88 | 43.01 |
| Organic | 14.66 | 15.15 | 15.15 | 16.17 |
| Total | 54.30 | 53.37 | 60.03 | 59.18 |
| Additives |  |  |  |  |
| Laponite RD | 0.44 | 0.43 | 0.48 | 0.49 |
| Lupranol 1100 | 0.44 | 0.43 | 0.48 | 0.49 |
| Tensid S | 0.39 | 0.38 | 0.39 | 0.39 |
| Agitan 281 | 0.72 | 0.71 | 0.89 | 0.90 |
| Nacure 2500 | 0.43 | 0.42 | 0.43 | 0.44 |
| EFKA 772 | 0.211 | 0.21 | 0.16 | 0.16 |
| Pluriol P900 | 1.00 | 0.98 | 2.29 | 2.32 |
| Polyethylene glycol | 0.11 | 0.11 | 0.11 | 0.11 |
| Disperbyk 184 | 0.36 | 0.36 | 0.35 | 0.36 |
| DMEA | 0.67 | 0.64 | 0.73 | 0.69 |
| Total | 4.76 | 4.65 | 6.33 | 6.35 |
| Grand total | 99.86 | 99.87 | 99.90 | 100.00 |

[a] amount refers to solids

In all formulations, absolute percentages by weight are stated.

Explanations Relating to the Table:
Aerosil R972—hydrophobic pyrogenic silica from Degussa
Laponite RD—rheological additive from Southern Clay Products
Tensid S—wetting agent from Biesterfeld
Agitan 281—defoamer from Münzing Chemie
Nacure 2500—curing catalyst from King Industries
EFKA 772—leveling agent from EFKA
Pluriol P900—wetting agent from BASF
Disperbyk 184—dispersing auxiliary from BYK
DMEA—dimethylethanolamine The basecoat materials of the invention are applied by electrostatic spraying to zinc-phosphatized metal bodywork panels coated with a commercial electrocoat material and with a commercial surfacer, so as to give basecoat films having dry film thicknesses (depending on shade) of from 12 to 30 μm. After a short evaporation time, overcoating is carried out with a commercial clearcoat material followed by baking at 130° C. for 30 minutes. A metal panel thus coated is again overcoated with the basecoat material of the invention and, after a short flash-off time, with a commercial two-component refinish material and is dried at 90° C. for 30 minutes. The dry film thicknesses of the clearcoats are approximately 40 μm. Paint systems with good leveling and very good mechanical properties are obtained.

After 240 hours of exposure to the constant condensation climate of SK DIN 50017, the painted metal panels show no changes on the surface of the paint. A subsequent adhesion test to DIN 53151 gives a value of 0. Subsequent bombardment with 1 000 g of angular chilled cast shot (4-5 mm in diameter) in an Erichsen stonechip device 508 in accordance with VDA [German automakers association] resulted only in slight chipping.

For the shade determinations, the values measured were as follows:

|  | Comparative example 1 | Example 1 | Comparative example 2 | Example 2 |
|---|---|---|---|---|
| 1 week stirring test |  |  |  |  |
| dL* | −0.1 | 0.0 | —a) | 0.08 |
| da* | 0.8 | 0.0 | —a) | −0.35 |
| db* | −5.6 | −0.2 | —a) | 0.05 |
| dC* |  |  | —a) | 0.34 |
| dh* |  |  | —a) | 0.08 |
| dE' |  |  | —a) | 0.36 |
| Result | unsat. | sat. | white specksa) | sat. |
| 2 weeks 40° C. oven storage |  |  |  |  |
| dL* | −0.2 | −0.2 |  |  |
| da* | 0.5 | 0.2 |  |  |
| db* | −3.3 | −0.5 |  |  |
| dC* | −3.3 | −0.6 |  |  |
| dh* | 0.0 | −0.1 |  |  |
| dL' | 3.3 | 0.6 |  |  |
| dE' | 3.3 | 0.57 |  |  |
| Result | unsat. | sat. |  |  | a)because of the formation of specks, it was not possible to make conclusive measurements The calorimetric measurements and their evaluation were made in accordance with DIN 6175-2. A dE' of more than 1 is a result which is unacceptable.

From the examples it is clear, therefore, that the compositions of the invention give better colorimetric results than the prior art compositions.

What is claimed is:

1. A pigmented coating composition comprising:
   one or more pigments;
   a water soluble, fatty acid modified epoxy ester resin; and
   a binder obtained by polymerizing (A) an ethylenically unsaturated monomer or a mixture of ethylenically unsaturated monomers in the presence of (B) a polyurethane resin.

2. A process for preparing a pigmented coating composition, comprising:
   adding to a coating composition a water soluble, fatty acid modified epoxy ester resin,
   wherein the pigmented coating composition comprises a binder obtained by polymerizing (A) an ethylenically unsaturated monomer or a mixture of ethylenically unsaturated monomers, in the presence of (B) a polyurethane resin, and
   further wherein the pigmented coating composition comprises a pigment.

3. The process of claim 2 wherein the water soluble, fatty acid modified epoxy ester resin, the fatty acid modified alkyd resin, or the mixture thereof is mixed with the pigment before mixing with the coating composition.

4. A process for making a coated surface, comprising applying the composition of claim 1 to a surface.

5. The process of claim 4, wherein the composition of claim 1 comprises at least one component of a basecoat-clearcoat system.

6. The process of claim 4, wherein the basecoat-clearcoat system is an automotive paint system.

7. The process of claim 4, wherein the automotive paint system is a refinish paint system.

8. A method of stabilizing a pigment in a coating composition, comprising mixing at least one pigment with a water soluble, fatty acid modified epoxy ester resin, wherein the coating composition comprises a binder obtained by polymerizing (A) an ethylenically unsaturated monomer or a mixture of ethylenically unsaturated monomers, in the presence of (B) a polyurethane resin.

9. The pigmented coating composition of claim 1, wherein the polyurethane resin (B) comprises polymerizable double bonds.

10. The pigmented coating composition of claim 1, wherein the number average molecular weight of the polyurethane resin (B) is from 200 to 30,000.

11. The pigmented coating composition of claim 1, wherein the ethylenically unsaturated monomer comprises an aliphatic or cycloaliphatic ester of acrylic acid or methacrylic acid, an ethylenically unsaturated monomer carrying at least one hydroxyl group in the molecule, an ethylenically unsaturated monomer carrying at least one carboxyl group in the molecule, or a mixture thereof.

12. The pigmented coating composition of claim 1, wherein the binder obtained by polymerizing the ethylenically unsaturated monomer or a mixture of ethylenically unsaturated monomers (A), in the presence of the polyurethane resin (B) comprises groups capable of forming anions.

13. The pigmented coating composition of claim 1, wherein the binder obtained by polymerizing the ethylenically unsaturated monomer or a mixture of ethylenically unsaturated monomers (A), in the presence of the polyurethane resin (B) is free of nonionic stabilizing groups.

14. The pigmented coating composition of claim 1, wherein the binder obtained by polymerizing the ethylenically unsaturated monomer or a mixture of ethylenically unsaturated monomers (A), in the presence of the polyurethane resin (B) comprises graft copolymers of (A) and (B).

15. A pigmented coating composition, comprising:
   a pigment;
   a water soluble, fatty acid modified epoxy ester resin; and
   a binder obtained by polymerizing:
   (A) an ethylenically unsaturated monomer or a mixture of ethylenically unsaturated monomers; in the presence of
   (B) a polyurethane resin comprising polymerizable double bonds, and having a number average molecular weight of from 200 to 30,000.

16. A pigmented coating composition comprising:
   one or more pigments;
   a water soluble, fatty acid modified epoxy ester resin, a fatty acid modified alkyd resin, or a mixture thereof; and
   a binder obtained by polymerizing (A) an ethylenically unsaturated monomer or a mixture of ethylenically unsaturated monomers in the presence of (B) a polyurethane resin, wherein the binder obtained by polymerizing the ethylenically unsaturated monomer or a mixture of ethylenically unsaturated monomers (A), in the presence of the polyurethane resin (B) comprises graft copolymers of (A) and (B).

17. The pigmented coating composition of claim 16, wherein the polyurethane resin (B) comprises polymerizable double bonds.

18. The pigmented coating composition of claim 16, wherein the number average molecular weight of the polyurethane resin (B) is from 200 to 30,000.

19. The pigmented coating composition of claim 16, wherein the ethylenically unsaturated monomer comprises an aliphatic or cycloaliphatic ester of acrylic acid or methacrylic acid, an ethylenically unsaturated monomer carrying at least one hydroxyl group in the molecule, an ethylenically unsaturated monomer carrying at least one carboxyl group in the molecule, or a mixture thereof.

20. The pigmented coating composition of claim 16, wherein the binder obtained by polymerizing the ethylenically unsaturated monomer or a mixture of ethylenically unsaturated monomers (A), in the presence of the polyurethane resin (B) comprises groups capable of forming anions.

21. The pigmented coating composition of claim 16, wherein the binder obtained by polymerizing the ethylenically unsaturated monomer or a mixture of ethylenically unsaturated monomers (A), in the presence of the polyurethane resin (B) is free of nonionic stabilizing groups.

* * * * *